Feb. 15, 1966 W. J. GILMORE 3,234,722
COMPACTED STRANDED CABLE
Filed April 12, 1963
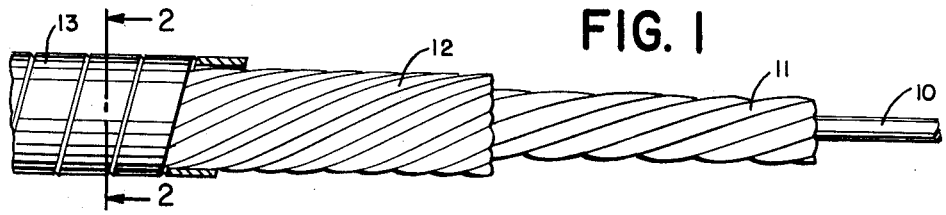
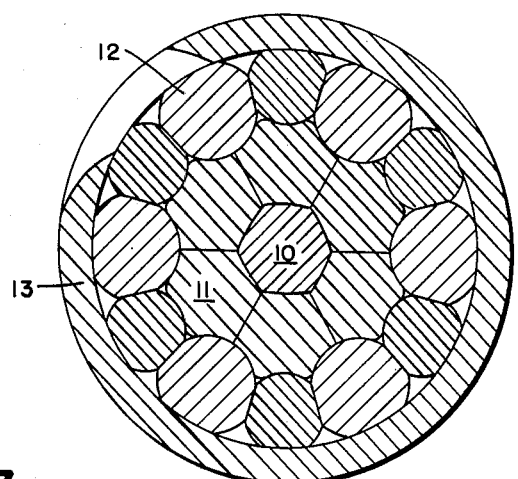
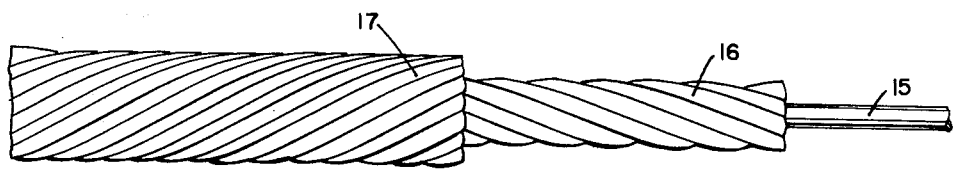
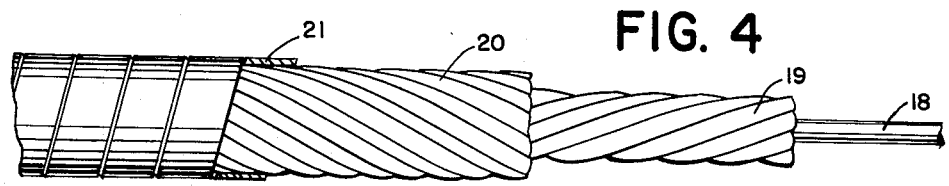
INVENTOR.
WILLIAM J. GILMORE
BY
ATTORNEYS

United States Patent Office 3,234,722
Patented Feb. 15, 1966

3,234,722
COMPACTED STRANDED CABLE
William J. Gilmore, Manitou Beach, Mich., assignor to American Chain & Cable Company, Inc., New York, N.Y., a corporation of New York
Filed Apr. 12, 1963, Ser. No. 272,686
5 Claims. (Cl. 57—145)

This invention relates to compacted stranded cable made up of a plurality of layers of elongated elements and, more particularly, to a cable of that type wherein the elongated elements of at least two adjoining layers are laid across one another and the inner layer of the two is preswaged before the next is applied. A method of making this cable is also provided.

One of the principal objects of the invention is to provide an improved tow cable for aircraft tow targets, though it quite evidently has application to other fields also. The modern target must be towed several thousands of yards behind its aircraft at supersonic speeds to provide a practical and safe simulation of an actual target for ground-to-air or air-to-air missiles. Among other reasons, this great tow length is necessary because many missiles are heat-seeking and the towing aircraft must be kept well outside their range. Perhaps the most important characteristic of a tow cable of this type is that it have the highest possible strength to diameter ratio. Wind drag at the contemplated speeds and tow lengths is one of the greatest sources of stress on the cable and hence its diameter should be as small as possible so that it presents a minimum frontal area. To this end it has been found to be of great advantage to compact the strands of the cable by swaging them together. Also, there is benefit to be gained from armoring the exterior of the cable throughout its length with a thin wrapping of flat wire to protect it from physical abuse and from the heat of the towing aircraft's jet exhaust. In some instances it is further necessary to provide against the rotational effect on the tow target which results from the tendency of a uni-directional lay cable to unwind under tension.

The present invention provides solutions to several problems which arise in attempting to meet these various standards of modern tow cable design. Broadly stated, the new compacted cable comprises a plurality of layers of elongated elements laid helically about the cable axis. At least one interior layer of this cable is preswaged radially with respect to the cable axis before the next layer is applied. The adjoining elements of these interior and next layers respectively are disposed across one another in a skewed relationship.

More specifically, the plurality of interior layers in the cable may comprise wire strands laid helically about the cable axis in the same direction with adjoining wire strands in adjoining layers disposed substantially parallel to one another. This plurality of interior layers is to be preswaged together and helically wrapped by an outer flat wire which also may be swaged. It is this outer flat wire which may constitute the elongated element crossing over the preswaged elements therebeneath. In another form, the plurality of layers of wire strands are laid in alternate directions from layer to layer with the strands of each layer crossing those of the layer therebeneath. In this case, each of the layers of wire strands is individually preswaged before the next layer is applied. Again, an outer wrapping of flat wire may be provided as a protective armor.

The method of the invention consists broadly in the steps of (1) laying elongated elements of one of a plurality of layers of such elements in a helical form about the cable axis, (2) preswaging that one layer of elongated elements radially with respect to the cable axis, and (3) laying at least one elongated element in another layer about the preswaged layer and in a helical form causing it to cross over the elongated elements of the preswaged layer. This is preferably followed by swaging the elongated element laid about the preswaged layer.

By preswaging the interior layer or layers which is wrapped about by the skewed elements of the next layer, the utmost compacting is obtained without nicking or indenting adjoining strands. This applies both to cross lay adjoining layers of interior wires in the cable and to an exterior short lay armor of flat wire which crosses over long lay strands. Preswaging deforms the already-laid parallel strands to the smallest cross sectional area and rounds off their respective outer "crown" surfaces to the fullest extent. As a result, the elongated elements of the next layer, whether they be cross lay strands or a short lay flat wire, can be swaged over the preswaged layer without being indented or nicked at the crossing points. This prevents the cable from being weakened, and in the case of armored cable permits the flat wire to be as thin as possible.

One primary end effect of this improved cable construction is an appreciable reduction in the diameter of a cable of given rated strength, and thus a corresponding decrease in its wind drag. The preswaging concept remains a notable contribution whether alternate layers of strands are cross laid to avoid a rotation effect under tension, whether the layers are laid unidirectionally to obtain the maximum possible compactness, or whether the cable is armored with flat wire or left bare.

Preferred embodiments of the invention are described hereinbelow with reference to the accompanying drawing, wherein—

FIG. 1 is a fragmentary elevation partly broken away of the new cable with its strands laid unidirectionally and armored with an exterior flat wire;

FIG. 2 is an enlarged section taken along the line 2—2 of FIG. 1;

FIG. 3 is a fragmentary elevation partly broken away of the new cable with cross lay strands and without exterior armor; and FIG. 4 is a fragmentary elevation partly broken away of the new cable with cross lay strands and with exterior armor.

Referring first to the embodiment of FIGS. 1 and 2, a core wire 10 coincident with the axis of the cable forms the central element of the structure. Stranded about the core wire 10 is a first layer of wire strands 11 which are of round cross section at the time of stranding. Six wires 11 serve for this first layer and they may be of a diameter equal to that of the core wire 10. Then, a second layer of wire strands 12 is laid helically about the first layer of strands 11. The wires 12 are laid in the same direction as the wires 11 but with a slightly lesser pitch so that the wires 11 and 12 which adjoin one another are disposed substantially in parallel. Twelve wires 12 may serve for this second layer and they nest fully about the cable if six of the wires are smaller in diameter as shown in FIG. 2. Valleys are defined between adjoining wires 11 in the first layer and it is intended during the stranding of the second layer to lay a larger wire 12 in each valley and a smaller wire 12 along a respective wire 11 between adjacent valleys. This positioning of the wire strands 11 and 12 gives the potential of ideal compactness, though the finished cable is subject to a certain rotation effect under tension because of the unidirectional lay of its strands.

An outer flat wire 13 is to be wrapped about the stranded cable in a helix which is considerably shorter though in the same direction as that of the wire strands 12 of the adjoining layer immediately therebeneath. Therefore, in accordance with the invention, the plurality of interior layers of wire strands 10, 11 and 12 are first preswaged together radially with respect to the cable axis before the outer armor strip 13 is applied. The effect of this preswaging step is best shown in FIG. 2. It deforms the first layer of wires 11 into the generally hexagonal shape shown so that the wires 12 are disposed even closer to the center of the cable, and the diameter of the over-all construction is reduced accordingly. In addition, the preswaging flattens the outwardly disposed surfaces or "crowns" of the wires 12 from a curvature about their own respective axes to a much smoother curvature about the axis of the entire cable. This is shown in FIG. 2. Consequently, when the flat wire 13 is laid in a helix shorter than but in the same direction as that of the strands 12, it can be swaged in turn without causing appreciable indentation where it crosses the preswaged and flattened interior wires 12. This permits the outer armor of flat wire 13 to be much thinner than would be necessary if it were swaged over undeformed wires 12 not in a preswaged condition. In addition, no single swaging operation on the complete armored cable could produce a degree of compactness at all comparable to that achieved by preswaging the interior layers before the flat armor is applied.

In FIG. 3, a cross lay cable is shown which is not equipped with flat wire armor. A central core wire 15 is wrapped about by a first layer of six round wire strands 16 much in the manner of the first layer of the previous embodiment. However, since this first layer is to be wrapped with a second layer of wire strands 17 of opposite lay to avoid the rotation effect produced in a unidirectional lay cable under tension, the first layer of wire strands 16 is preswaged before the next layer of wire strands 17 is applied. This compacts the wire strands 16 closely about the core wire 15 and rounds off their outwardly disposed "crown" surfaces. When the next layer of wire strands 17 is helically applied in an opposite lay, the strands 17 cross over smoothly rounded sections of the wire strands 16. Thereafter, the wire strands 17 are swaged in a final compacting operation and it is during this step that indentation of the wire strands 17 is avoided by the earlier preswaging of the wire strands 16.

In general, it is contemplated that each of the layers of wire strands in this cross lay form of the cable be individually preswaged radially with respect to the cable axis before the next layer is applied, because the layers are of alternate lay from layer to layer and all strands cross over those which are immediately beneath them. A transverse section taken through the FIG. 3 cable which does not intersect any of the crossing points between adjoining wires would appear substantially the same as the section of FIG. 2 except that there would be no outer armor of flat wire. A transverse section taken through the crossing points would show a slightly less degree of compacting than appears in FIG. 2 because some of the wires 17 which otherwise rest in valleys between pairs of wires 16 would be removed from those valleys and would thus be slightly farther from the cable axis. It can be said that the embodiment of FIGS. 1 and 2 achieves slightly more compactness at the expense of a certain rotation effect under tension, whereas the FIG. 3 embodiment avoids the rotation effect but sacrifices a slight amount of compactness. Both forms of the new cable have their own unique advantages depending upon the circumstances of use.

In FIG. 4, a form of the new cable is shown which includes a central core wire 18 with a first layer of strands 19 helically disposed about it. Again, there may be six wires in this first layer and they are to be preswaged as described in reference to FIG. 3 because they are subsequently wrapped about by a cross lay layer of wires 20. The wires 20 are therefore not indented by any sharply curved crown sections of the wires 19 and the strength of the cable is enhanced accordingly. As in the previous embodiments, two sizes of wires 20 may be employed to provide the optimum circumferential disposition about the wires 19. The FIG. 4 embodiment differs from that of FIG. 3 only in that it is armored exteriorly by a wrapping of flat wire 21 which is of short lay opposite in direction to that of the second layer of wire strands 20. Since the flat wire 21 crosses the strands 20, the second layer of strands 20 is preswaged before the flat wire 21 is applied. The advantages thus gained in permissible thinness of the flat wire 21 are the same as those resulting from the FIG. 1 embodiment because the preswaged second layer of wires 20 is flattened to a degree where it will not seriously indent the flat armor wire 21.

In each of these embodiments, an exceptional decrease in the diameter of a cable of given rated strength is attained as a result of the preswaging concept. Also, when armor of flat wire is incorporated in the cable, it may be made much thinner than has been possible heretofore. The net effect of these improvements is to reduce greatly the wind resistance on the new cable when it is used as an aircraft target tow line. With this decrease in wind drag, a substantial increase in the maximum tow length of a given cable is made possible and thus the target drone can be pulled along much farther beyond its aircraft. As noted previously, this is of substantial benefit for missile use because it insures that the manned towing aircraft can be well out of range of the target.

Where the terms "swaged," "preswaged" and variations thereof are used in this specification and the following claims, it is to be understood that they are also intended to cover various other radial compressing operations for compacting the cable structure, such as rolling.

I claim:

1. A compacted stranded cable comprising a plurality of layers of wire strands laid helically about the cable axis, in alternate directions from layer to layer with the strands of each layer laid across those of the layer immediately therebeneath, each of said layers of wire strands being individually preswaged radially with respect to the cable axis before the next layer is applied.

2. A compacted stranded cable according to claim 1 wherein said layers surround a substantially straight core wire strand coincident with the cable axis.

3. A compacted stranded cable comprising a plurality of interior layers of wire strands laid helically about the cable axis in alternate directions from layer to layer with the strands of each layer laid across those of the layer immediately therebeneath, each of said interior layers of wire strands being individually preswaged radially with respect to the cable axis, before the next layer is applied, and on outer flat wire helically wrapped and swaged about the preswaged plurality of interior layers of wire strands across the wire strands of the adjoining interior layer immediately therebeneath.

4. A compacted stranded cable comprising a plurality of interior layers of wire strands laid helically about the cable axis in alternate directions from layer to layer with the strands of each layer laid across those of the layer immediately therebeneath, each of said interior layers of wire strands being individually preswaged radially with respect to the cable axis before next layer is applied, and an outer flat wire helically wrapped and swaged about the preswaged plurality of interior layers of wire strands across the wire strands of the adjoining interior layer immediately therebeneath, the helix of said flat wire being shorter than and in an opposite direction to that of the wire strands of the adjoining layer immediately therebeneath.

5. A compacted stranded cable according to claim 4 wherein said layers surround a substantially straight core wire strand coincident with the cable axis.

(References on following page).

References Cited by the Examiner

UNITED STATES PATENTS

| | | | |
|---|---|---|---|
| 251,114 | 12/1881 | Hallidie | 57—145 |
| 1,943,086 | 1/1934 | McKnight | 57—161 X |
| 1,943,087 | 1/1934 | Potter et al. | 57—145 X |
| 1,992,707 | 2/1935 | Lloyd | 57—161 |
| 2,104,121 | 1/1938 | Gleason | 57—161 X |
| 2,122,911 | 7/1938 | Hunter et al. | 57—161 |
| 2,156,652 | 5/1939 | Harris | 57—145 |
| 2,978,860 | 4/1961 | Campbell | 57—145 |
| 3,083,817 | 4/1963 | Campbell. | |
| 3,130,536 | 4/1964 | Peterson et al. | |

FOREIGN PATENTS 690,014   4/1953   Great Britain.

MERVIN STEIN, *Primary Examiner.*